Dec. 20, 1960  W. R. HOOVER ET AL  2,964,952
STRAINGAGE RATE GYRO
Filed Oct. 6, 1958

INVENTORS
WARREN R. HOOVER
ROBERT F. DEVEREUX
BY

ATTORNEY

United States Patent Office 2,964,952
Patented Dec. 20, 1960

2,964,952

STRAINGAGE RATE GYRO

Warren R. Hoover, San Diego, and Robert F. Devereux, La Jolla, Calif., assignors to General Dynamics Corporation, San Diego, Calif., a corporation of Delaware Filed Oct. 6, 1958, Ser. No. 765,550

4 Claims. (Cl. 74—5.6)

This invention relates to gyroscopes in general and particularly to a gyroscope having an improved motion sensing device.

It is well known that when a moving craft changes its attitude with respect to an axis, motion about that axis results. Frequently, it is desired that the craft attitude change be corrected. This is usually accomplished by means of a gyroscopic device which is responsive to craft motion and serves to translate the motion into electrical impulses which in turn are utilized to actuate suitable craft control mechanisms to correct the attitude of the craft such that it adopts the attitude desired.

Heretofore, gyroscopic devices used to detect changes in movement of a craft had certain disadvantages. For example, such devices employed gyroscopes having a rotor mounted on a spin axis in a gimbal ring which was gimballed for movement about an axis perpendicular to the axis of rotation of the rotor. The electrical signal producing portion of the devices usually took the form of a potentiometer contact fixed to the gimbal ring of the gyroscope and adapted to sweep across a fixed potentiometer resistor as the gimbal ring rotated. A spring was provided to restrain the gimbal ring to a central position in which the potentiometer contact engaged the midpoint of the potentiometer resistor. A source of voltage connected across the potentiometer provided the electrical energy source and the output of the sensing device was taken from across the potentiometer contact and the mid-point of the potentiometer resistor. In operation any turn of the craft about an axis resulted in precession of the gyroscope about the axis against the spring restraint to an extent determined by the rate of turn. Hence, the output was proportional to the rate of turn. Devices of this type are subject to disadvantages, among them being an unfavorably large amount of friction developed by the gimbal system resulting in lowered sensitivity, high minimum threshold rate to which the device will give a measurable output, and a low natural frequency of the system which negatives the use of electrical damping of the gyroscope output.

The improved gyroscope of the subject invention overcomes the deficiencies of the previous devices by providing a gimbal ring actuated sensing beam structure which minimizes frictional effects, thus increasing sensitivity, providing a lower detectable threshold, and providing increased natural frequency of the gyroscope system, which eliminates the need for mechanical dampers and permits electrical damping of the gyroscope output.

The improved gyroscope utilizes resilient constant stress beams to provide restraint, the beams being flexure pivotally connected at one of their ends to a plate or beam which is in turn mounted on a support portion of the gyroscope. The other ends of the beams are flexure pivotally connected to a beam which in turn is connected by way of a constant stress cantilever beam to the movable gimbal of the gyroscope, thus eliminating the friction encountered between relatively movable parts such as pick-offs having the potentiometer contact and resistor of previous devices. Increased linearity and natural frequency is achieved by not allowing the sensing rotor to be greatly displaced from the sensing axis. The device further uses elastic type sensing elements having electrical characteristics which vary with tension and compression and thus further minimize friction in the system. The elastic elements are in the form of strain gages which are bonded to the constant stress beams and whose resistances vary with flexure of the beams proportional to the movement of the gimbal transmitted through the cantilever beam, and flexure pivot.

It is therefore an object of this invention to provide an improved gyroscope which minimizes frictional errors.

Another object is to provide an improved gyroscope having increased sensitivity and linearity.

Still another object is to provide an improved gyroscope which produces a low threshold minimum rate signal.

A further object is to provide a gyroscope which eliminates mechanical dampers and operates at higher natural frequencies permitting electrical damping of the gyroscope output.

A final object is to provide a gyroscope which is simple, compact, economical and reliable.

Other objects and features of the present invention will be readily apparent to those skilled in the art from the following specification and appended drawings wherein there is illustrated a preferred form of the invention and in which.

Figure 1:
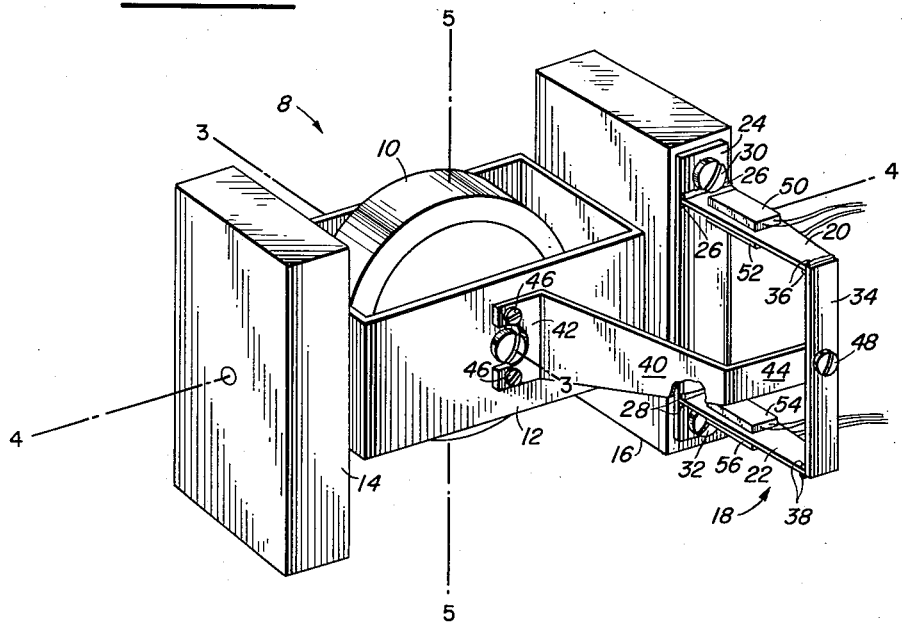
Figure 1 is a perspective view of the gyroscope embodying the invention.

Referring now to the drawings wherein like reference characters designate like or corresponding parts throughout the several views there is shown generally in Figure 1, a gyroscope 8 having a rotor 10 mounted for spinning about an axis 3—3 in a rotor bearing member or gimbal 12. The gimbal 12 is pivoted for movement about an axis 4—4 normal to the axis 3—3 in support members 14 and 16, which are adapted to be mounted, as for example, in an aircraft or other vehicle such that they are movable about an axis 5—5.

When the support members 14 and 16 are rotated about the axis 5—5, the gyroscope is caused to precess. The force of precession is proportional to the rate of the movement impressed upon the gyroscope about the axis 5—5. In order to obtain a measure of the angular movement about the axis 5—5, a sensing device in the form of a flexure pivot cantilever beam arrangement 18 is connected between the gimbal 12 and one of the supports 16. Since the flexures or deformations developed in the flexure pivot cantilever beam arrangement 18 by movement of the gimbal 12 relative to the support 16 are linear and proportional to such movement, they are also proportional to the precessional forces on the gyroscope and accordingly would be a measure of the angular movement of the gyroscope about the axis 5—5.

The sensing device 18 consists of a pair of constant stress, flat beams 20 and 22, in spaced parallel arrangement, each having one of its ends soldered, as with silver solder or the like, to a mounting plate or beam 24, thus providing friction-free flexure pivot joints 26 and 28. The plate 24 is secured to the support 16 as by bolts 30 and 32 or any other suitable means. A beam 34 is provided which has its ends soldered to the other two ends of the beams 20 and 22, thus providing additional friction-free flexure pivot joints 36 and 38, and forming the generally rectangular beam structure. The beams 20, 22 and 34 can be fashioned of a beryllium-copper alloy or the like. A cantilever beam member 40 connecting the gimbal 12 and the sensing device 18 has parallel end portions 42 and 44, the end portion 42 being secured to the gimbal 12 as by bolts 46 and the end portion 44 being secured to the beam 34 as by bolt 48 or the like.

Means are provided for producing electrical signals in accordance with the flexures or deformations produced in the beams 20 and 22 resulting from relative movement between the gimbal 12 and the supports 14 and 16. As shown, such a means may consist of a plurality of electrical pickoffs in the form of strain gages 50, 52, 54 and 56 which are arranged in a bridge circuit relationship on the upper and lower faces of the beams 20 and 22. The gages 50, 52, 54 and 56 are suitably insulated and are cemented or bonded to the faces of the beams 20 and 22 with a suitable cement adapted to secure and insulate, such as Glyptal or the like.

Figure 2:
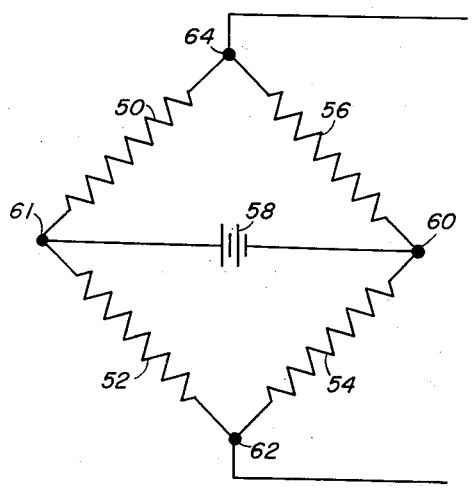
Figure 2 is a schematic diagram of a typical circuit in which the strain sensing devices of Figure 1 can be incorporated.

Referring to Figure 2, there is illustrated a typical manner of connecting the strain gages in a bridge arrangement wherein the gages 50 and 52 constitute one branch and the gages 54 and 56 form the other branch. The bridge circuit may be energized, as shown, from a source of electrical energy, such as the battery 58 which is connected across the junctions 60 and 61. The output signal of the bridge is arranged to be taken from across the junctions 62 and 64 and can be utilized to actuate suitable actuations, well known in the art, as for example, servo motors to correct the attitude of the craft in response to the output signal.

In operation, as the craft, and consequently the support members 14 and 16 rotate about the axis 5—5, a precessional force on the gyroscope is exerted which is proportional to the rate of movement of the craft and which produces a tilting or angular movement of the gimbal 12 about the axis 4—4. The angular movement of gimbal 12 thus produced results in corresponding movement of the beam 40 and beam 34 attached thereto. Since the beam 34 is flexure pivotally connected to the beams 20 and 22 at 36 and 38 and the beams 20 and 22 are flexure pivotally secured to the plate 24, deformations in the beams 20 and 22 are produced corresponding to the rate of movement of the gimbal 12 and consequently the rate of movement of the craft about the axis 5—5. The deformations thus produced in the beams 20 and 22 are detected by the strain gages 50, 52, 54 and 56, which, as is well known, consist of fine electrical resistance wire whose resistance varies with the magnitude of the compression or tension applied thereto. Thus, as the beams 20 and 22 are flexed, as for example, in the downward direction, the gages 50 and 54 are subjected to tension and the gages 52 and 56 are subjected to compression, resulting in a change of the electrical resistance characteristics of the gages in an opposite sense. As is well known, if the gages 50 and 54 are flexed so as to increase in resistance and the gages 52 and 56 decrease in resistance, the bridge becomes unbalanced and a current flows in the output circuit connected to the junctions 62 and 64, which corresponds to the amount of flexure of the beams 20 and 22.

While a certain preferred embodiment of the invention has been specifically disclosed, it is to be understood that the invention is not limited thereto since many variations will be readily apparent to those skilled in the art and the invention is to be given its broadest possible interpretation within the terms of the appended claims.

What we claim is:

1. A sensing device for detecting movement between relatively movable members comprising a plurality of resilient beams, a plate, means for flexure pivotally connecting together said beams and said plate to form a generally rectangular arrangement having each of its sides defined by one of said beams and said plate, said plate being adapted to be rigidly connected to one of said relatively movable members, a beam member having one end rigidly attached to the resilient beam defining the side of said rectangular arrangement which is opposite to the side defined by said plate, and the other end adapted to be rigidly attached to the other of said relatively movable members, and means responsive to deformations produced in the beams which define opposite sides of said rectangular arrangement by relative movement of said relatively movable members for providing signals proportional to said deformations.

2. A sensing device for detecting movement between relatively movable members comprising a plurality of resilient metallic beams, a metallic plate, solder joints connecting together said beams and said plate to form a generally rectangular arrangement having each of its sides defined by one of said beams and said plate, said plate being adapted to be rigidly connected to one of said relatively movable members, a beam member having one end rigidly attached to the beam defining the side of said rectangular arrangement which is opposite to the side defined by said plate, and the other end adapted to be rigidly attached to the other of said relatively movable members, and means responsive to deformations produced in the beams which define opposite sides of said rectangular arrangement by relative movement of said relatively movable members for providing signals proportional to said deformations.

3. A gyroscope device comprising a support, a rotor bearing member mounted on said support for movement about a first axis, a rotor mounted in said rotor bearing member for rotation about an axis normal to said first axis, a plurality of resilient beams, a plate, means for flexure pivotally connecting together said beams and said plate to form a generally rectangular arrangement having each of its sides defined by one of said beams and said plate, means for rigidly connecting said plate to said support, beam means having rigid connections to both said rotor bearing member and the beam defining the side of said rectangular arrangement which is opposite to the side defined by said plate, and means responsive to deformations produced in the beams which define opposite sides of said rectangular arrangement by relative movement of said rotor bearing member with respect to said support for providing signals proportional to said deformations.

4. A gyroscope device comprising a support, a rotor bearing member mounted on said support for movement about a first axis, a rotor mounted in said rotor bearing member for rotation about an axis normal to said first axis, a plurality of resilient metallic beams, a metallic plate, solder joints connecting together said beams and said plate to form a generally rectangular arrangement having each of its sides defined by one of said beams and said plate, means for rigidly connecting said plate to said support, beam means having rigid connections to both said rotor bearing member and the beam defining the side of said rectangular arrangement which is opposite to the side defined by said plate, and means responsive to deformations produced in the beams which define opposite sides of said rectangular arrangement by relative movement of said rotor bearing member with respect to said support for providing signals proportional to said deformations.

References Cited in the file of this patent

UNITED STATES PATENTS

| | | |
|---|---|---|
| 2,459,495 | Brown | Jan. 18, 1949 |
| 2,602,239 | Wrigley | July 8, 1952 |
| 2,685,207 | Barkalow et al. | Aug. 3, 1954 |
| 2,746,301 | Henderson | May 22, 1956 |
| 2,875,618 | Altman | Mar. 3, 1959 |